June 17, 1958     C. E. GREGORY     2,839,031
MOTION STORAGE DEVICE

Filed Feb. 23, 1952     3 Sheets—Sheet 1

INVENTOR.
CHARLES E. GREGORY
BY Herbert L. Davis
ATTORNEY

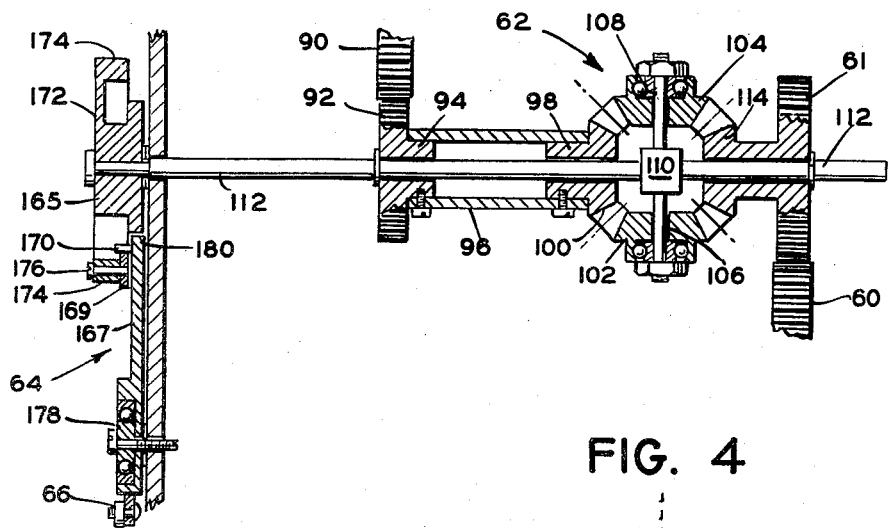
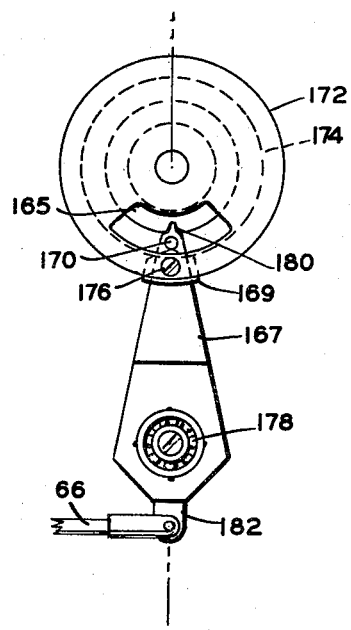
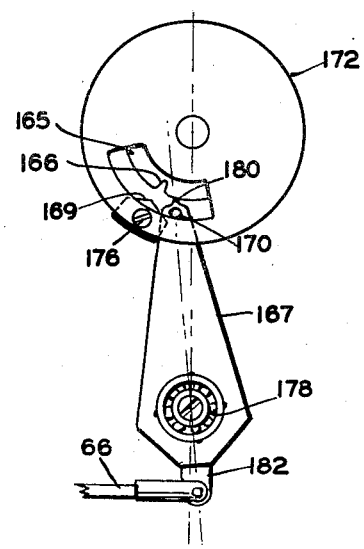

June 17, 1958  C. E. GREGORY  2,839,031
MOTION STORAGE DEVICE
Filed Feb. 23, 1952  3 Sheets-Sheet 3

INVENTOR.
CHARLES E. GREGORY
BY Herbert L. Davis
ATTORNEY

United States Patent Office 2,839,031
Patented June 17, 1958

2,839,031

MOTION STORAGE DEVICE

Charles E. Gregory, Plainville, Conn., assignor to Bendix Aviation Corporation, Teterboro, N. J., a corporation of Delaware Application February 23, 1952, Serial No. 273,020

8 Claims. (Cl. 121—41)

The present invention relates to an improved motion storage device for use in a propeller pitch control system.

The term motion storage device is used to denote a mechanism in which motion from an initiating source in excess of a predetermined initial value may be stored without imparting a corresponding movement to a servo device controlled through the mechanism until such stored movement is expended by movement of a motor means controlled by the servo device and which movement of the motor means effects through suitable follow-up means a counter action on the mechanism which removes the stored motion.

An object of the invention is to provide a novel motion storage device arranged to impart a motion to a lever or other actuating member in a manner that will remain synchronous with the starting point of the motion.

Another object of the invention is to provide a mechanism including four gears and two index plates, so arranged as to impart a motion to a lever or other actuating member in a manner that will, regardless of the number of revolutions of the prime mover, within the designed range of the gears, always remain synchronous with the starting point of the motion.

Another object of the invention is to provide a novel motion storage device having application in automatic control systems for controlling the movement of a control device such as a servo valve or other such device which must maintain a synhcronous center or zero point with respect to a prime mover.

Another object of the invention is to provide a novel motion storage device arranged to effect a maximum opening of a servo pilot valve with a few degrees of rotation of a controlling prime mover, while permitting the controlling prime mover to be further rotated without changing the valve position.

Another object of the invention is to provide a novel motion storage device for use in the aforenoted control system, including a pair of gears of different size affixed one to the other and having a different number of teeth in mesh with teeth of another pair of gears, freely rotatable relative one to the other for driving two circular index plates provided with cooperating index notches and serving to position a control lever upon adjustment of the notches relative one to the other so as to provide capacity for storing the number of revolutions of the gear assembly imparted by the main control in either direction from the neutral or starting point at which the notches are in coincidence.

Another object of the invention is to provide another form of motion storage device in which there is provided a single arm having a pin contacting an internal ring and in turn a cam affixed to the ring so as to move a toothed end of the arm into a neutral position in a notch formed in a rotatable disc or boss concentrically positioned with respect to and integral with the ring.

The above and other objects and features of the invention will appear more fully hereinafter from a consideration of the following description taken in connection with the accompanying drawings wherein several embodiments of the invention are illustrated by way of example.

In the drawings:

Figure 3 is a detailed drawing of the novel bevel gear differential, motion storage device and follow-up gearing arrangement of the control system of Figure 2.

Figure 4 is a plan view of the motion storage device of Figure 3.

Figure 5 is another view of the motion storage device of Figure 4 with the control arm in an adjusted position.

Figure 1:
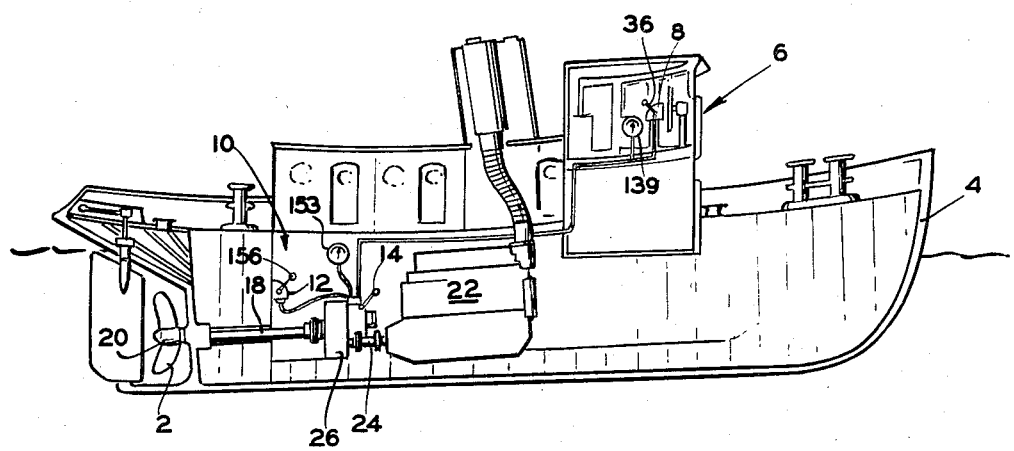
Figure 1 is a sectional inboard profile view of a typical marine craft or vessel embodying the novel propeller pitch control system.

Referring now to the drawing of Figure 1, the subject control system is arranged to control the pitch of the blades of a controllable pitch and reversible propeller 2 of a marine craft or vessel indicated generally by the numeral 4. The pitch of the propeller 2 may be controlled either from a main control station or bridge 6 of the vessel by a control unit 8 electrically connected into the control system as hereinafter indicated; or manually from an engine room 10 of the vessel by a control unit 12. There is further provided in the engine room 10 a control lever 14 manually operable for shifting the control of the propeller pitch from the bridge 6 to the engine room 10 at the will of the operator, as explained hereinafter with reference to the schematic diagram of Figure 2.

Figure 2:
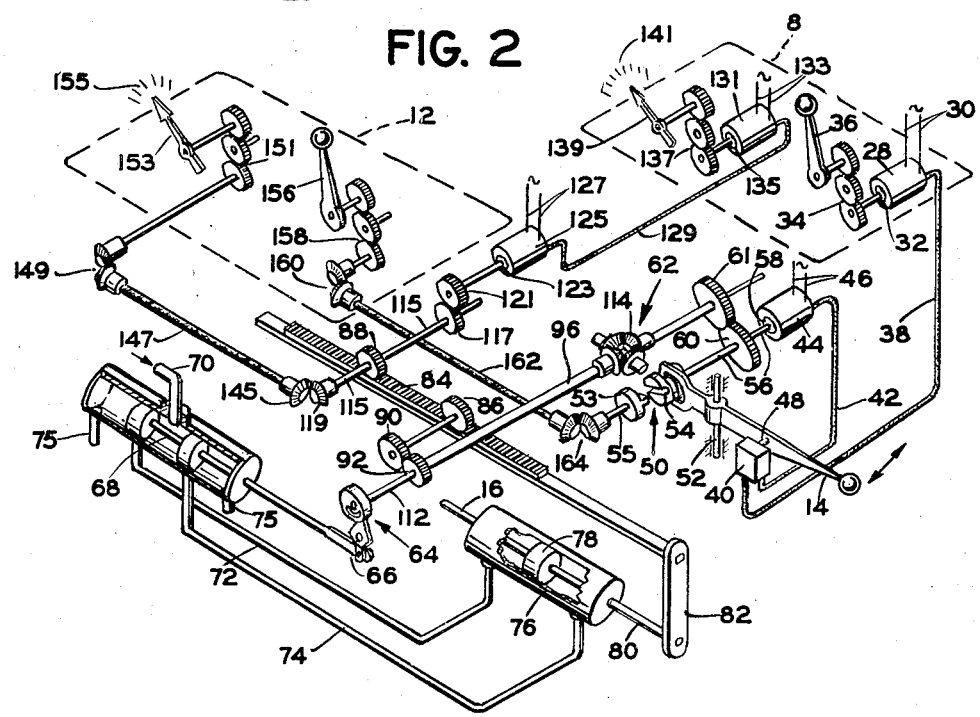
Figure 2 is a schematic diagram of the propeller pitch control system.

The controllable pitch propeller 2 may be of conventional type controlled by a suitable rack (not shown) adjustably positioned by a rod 16, shown in Figure 2, and extending coaxially in a shaft 18. The rack extends into the hub 20 of the propeller 2. The rack is arranged so as to operably engage with suitable pinion gears (not shown) and of conventional type, made a part of each of the blades of the propeller 2 so that moving the rod 16 forward or aft causes the rack to rotate the pinions whereby the pitch of the blades of the propeller 2 is changed. The propeller 2 is in turn driven by an engine 22 which may be of the diesel type through a shaft 24, reduction gearing 26 and the shaft 18 in which is arranged in coaxial relation the propeller pitch adjusting rod 16 of Figure 2.

Such a controllable pitch propeller eliminates the need for a reverse gear and permits the use of an optimum propeller for each condition of load. It improves maneuverability with certain types of diesel engines in that the engine need not be stopped and reversed, but may be continuously run while the pitch of the propeller 2 is altered or reversed to reverse the motion or alter the thrust of the vessel.

Referring now to the schematic drawing of Figure 2, the dotted lines indicate the control units 8 and 12 from the structure of the servo unit. The bridge control unit 8 includes a variable coupling electrical transmitting device or synchro 28 of conventional type having an input connected by conductor 30 to a suitable source of alternating current and a rotor 32 operated through a gear train 34 by a hand lever 36. The synchro 28 has an output electrically connected through suitable electric cable 38, switch 40 of conventional type and electric cable 42 to a matching receiver synchro or electric motor means 44 of conventional type and also connected by conductors 46 to the alternating current source.

The switch 40 is of the normally open type and electrically connects the synchros 28 and 44 in operative relation upon adjustment of lever 14 into actuating relation to a control button 48 of the switch 40 so that control of the synchro 44 is from control unit 8. Simultaneously with such adjustment of lever 14, a clutch or mechanical coupling 50 of a conventional type is operated by the lever 14 pivoted on bearings 52. The coupling 50 includes cooperating elements 53 and 54. Element 53 is fastened to a shaft 55, while element 54 keyed to a shaft 56 and longitudinally movable thereon is arranged to be individually positioned by a lever 14 to connect and disconnect shaft 55 and shaft 56 of rotor 58 of the synchro 44.

For reasons to be given, when the clutch 50 is operated by lever 14 so as to drivingly connect shaft 55 to rotor shaft 56, the electrical connection between the synchros 28 and 44 is broken by the lever 14 disengaging control button 48 so as to permit switch 40 under force of a biasing spring in the switch mechanism, not shown, to assume a normally open circuit position.

Figure 6:
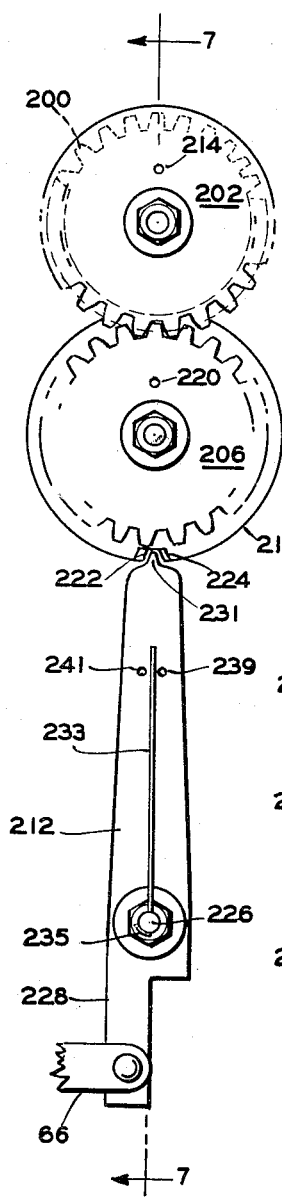
Figure 6 is a plan view of another form of motion storage device for use in the propeller pitch control system of Figure 2 in place of the device of Figures 4 and 5.
Figure 7:
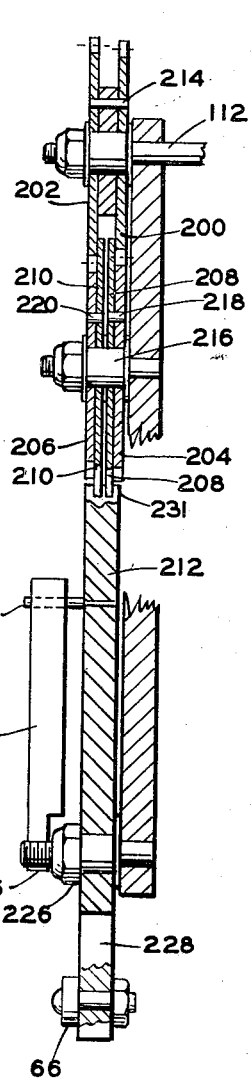
Figure 7 is a sectional view of the motion storage device of Figure 6 taken along the lines 7—7.
Figure 8:
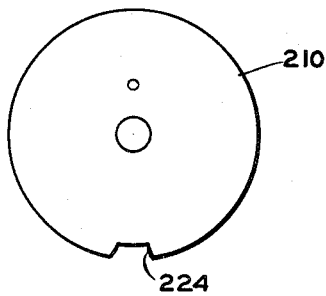
Figure 8 is a plan view of one of the indexing discs of Figure 7.
Figure 9:
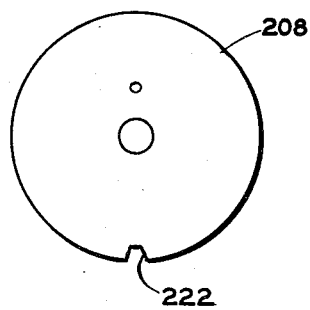
Figure 9 is a plan view of the other indexing disc of Figure 7.

The rotor 58 of the receiving synchro 44 is operatively connected through shaft 56, gears 60 and 61, and a differential gearing unit 62 so as to drive a motion storage device indicated generally by the numeral 64 and which may be of the type shown in detail in Figures 4 and 5 or of the type shown in Figures 6 and 7.

The motion storage device 64 has a valve actuating rod 66 controlling a hydraulic servo valve 68 of conventional type and which directs the flow of high pressure fluid or oil from an inlet line 70 to either of two outlet lines 72 or 74 and from the other of the lines 72 or 74 to a drain conduit 75 in a conventional manner.

The output lines 72 and 74 lead to a main power cylinder 76 in which is slidably mounted a piston 78 which under the force of the high pressure fluid positions the propeller pitch control rod 16 affixed thereto and extending through one end of the power cylinder 76. Another rod 80 affixed to the piston 78 extends through the opposite end of the cylinder 76 and has affixed thereto a connecting arm 82 at the top end of which is affixed a movable rack 84.

Engaging the rack 84 are gears 86 and 88. Gear 86 drives a gear 90 which in turn meshes with a gear 92 which, as shown in Figure 3, is provided with a hub 94 to which is fastened one end of a hollow shaft 96. The other end of the hollow shaft 96 is fastened to a hub 98 of a gear 100 of the differential gearing unit 62. Intermediate gears 102 and 104 of the differential gearing are rotatably mounted on stub shafts 106 and 108 respectively of a differential spider 110 affixed to a shaft 112.

As best shown in Figure 3, the gear 61, of the schematic drawing of Figure 2, is formed integral with a gear 114 of the differential gearing unit 62. The gears 92, 100, 114 and 61 are freely rotatable on the shaft 112. Affixed to one end of the shaft 112 is secured the motion storage device 64, shown in Figures 4 and 5, and described hereinafter.

Pinion gear 88, engaging rack 84, has secured thereto a shaft 115 to which there is affixed at opposite ends thereof pinion gears 117 and 119. The pinion gear 117 engages a second gear 121 which in turn rotates a rotor 123 of a transmitting synchro 125. The synchro 125 is of conventional type and is electrically connected at its input 127 to the source of alternating current and has an output connected in a conventional manner through cable 129 to a receiving synchro or electric motor means 131 also of conventional type connected to the source of A. C. at 133 and having a rotor 135 geared at 137 to a pointer 139 cooperating with a suitable indicator scale 141. Thus adjustment of the rotor of the transmitting synchro 125 will cause a corresponding adjustment of the rotor of the receiving synchro 131 so as to position pointer 139 to indicate to the operator of the lever 36 at the bridge or main control station 6 of the vessel the adjusted pitch of the propeller 2.

The bevel gear 119 at the opposite end of the shaft 115 is mated with a similar gear 145 to which is connected one end of a flexible shaft 147. A similar bevel gear assembly 149 at the other end of the flexible shaft 147 is connected with a gear train 151 to position a suitable pointer 153 cooperating with a suitable indicator scale 155, so that adjustment of the rack 84 will cause a corresponding adjustment of the pointer 153 so as to indicate to the operator of control unit 12 in the engine room 10 the actual adjusted pitch of the propeller 2.

As heretofore described, the clutch or mechanical coupling 50 is disconnected when the synchros 28 and 44 are electrically connected through switch 40. When the coupling 50 is connected the electrical connections between the synchros 28 and 44 are disconnected by the switch 40. As shown in Figure 2, the simultaneous operation of the clutch 50 and switch 40 is effected through lever 14 pivoted at 52 and cooperating with the coupling element 54 and switch 40 so as to disconnect the coupling element 54 from element 53 and close switch 40 for control of the propeller pitch from the bridge 6 upon a clockwise adjustment of lever 14; and engage coupling element 54 with element 53 and open switch 40 for control of the propeller pitch from the engine room 10 upon a counterclockwise adjustment of lever 14.

In the latter adjusted position of the lever 14, manual adjustment of the motion storage device 64 may be effected by adjustment of a control lever 156 in the engine room 10. The lever 156 is arranged so as to adjustably position through gearing 158, bevel gear assembly 160, flexible shaft 162, bevel gear assembly 164, shaft 55, coupling 50, shaft 56 and gearing 60 and 61, the differential gearing 62 and thereby the motion storage device 64 to in turn control the position of the servo valve 68 and thereby the propeller pitch control piston 78.

*Operation of the propeller pitch control system*

The operation of the control system of Figures 1 and 2 will be first described when the control is from the bridge 6 of the vessel 4. In that case, the lever 14 of Figure 2 is first adjusted in a clockwise direction so that the coupling 50 is disconnected and the synchros 28 and 44 are electrically connected through switch 40. For purposes of explanation, assume first that the vessel 4 is lying dead in the water with the propeller 2 turning over at neutral or zero pitch. When propeller thrust is required and the magnitude and direction determined, the hand lever 36 is moved to a position indicative of the desired pitch.

Moving the control lever 36 will rotate the rotor 32 of the transmitter synchro 28 to induce an electrical signal in the receiver synchro 44 causing an electromagnetic force producing a torque in the rotor 58 of the receiver synchro or electric motor means 44 effecting a corresponding adjustment of the rotor 58 of the receiving synchro 44 which in turn rotates the gears 60—61 of Figures 2 and 3 and gear 114 of the differential gearing 62. Since gear 100 of the differential gearing 62 is locked by the rack 84 through gears 92, 90 and 86, the rotation of the gear 114 in turn rotates intermediate gears 102 and 104 and through stub shafts 106 and 108, the shaft 112 of the spider 110.

The shaft 112 extends through the hollow shaft 96 and rotates with the intermediate gears to rotate the motion storage device 64, as hereinafter described. The motion storage device 64 in turn actuates the control valve 68 to direct hydraulic pressure medium supplied through inlet line 70 to the proper outlet line, for example line 74. This hydraulic pressure medium acts on the piston 78 in cylinder 76 to move the propeller pitch control rod 16 whereby the blades of the propeller 2 are adjusted to the desired pitch.

Because of the connecting arm 82, as the rod 16 moves, rack 84 will also move. As the rack 84 moves, pinion gear 86 will be rotated to rotate gears 90—92 and hollow shaft 96. The rotation of shaft 96 rotates gear 100 of the differential gear 62 which, because gears 114, 61 and 60 are held stationary by the torque exerted by the synchro 44 causes spider 110 to rotate in an opposite direction to that previously described. Rotation of the spider shaft 112 connected to the motion storage device 64 rotates that assembly to move back to a neutral position the rod 66 of the control valve 68.

The centering of the valve 68 stops the flow of pressure medium to the power cylinder 76 and motion of shaft 16 and rack 84 stops. The gearing is so determined that the new position of the rack 84 corresponds to the ordered pitch as set into the system by lever 36 in the bridge control station.

Simultaneously with the rotation of gear 86 by the rack 84, the gear 88 also in engagement with the rack 84 is rotated. As shown in Figure 2, this gear 88 is connected through gears 117 and 121 to position rotor 123 of a transmitter synchro 125. As the rotor of the synchro 125 is positioned, the electrical signal induced and transmitted to the receiver synchro 131 causes the rotor 135 of synchro 131 to position a pointer 139 in the bridge control station cooperating with the indicator scale 141 so as to indicate the actual pitch of the propeller 2 so that the ordered pitch determined by the position of the lever 36 and actual pitch as indicated by pointer 139 will be brought into coincidence.

Also connected to gear 88 by shaft 115 are the pair of bevel gears 119 and 145 which drive through the flexible shaft 147 and the gearing 149 a pitch indicator pointer 153 in the engine room 10. The indicator pointers 139 and 153 at the bridge control and engine room, respectively, in normal operation always indicate the actual pitch of the blades of the propeller 2 regardless of whether the bridge control lever 36 or engine room control lever 156 is in operation.

When control is desired from the engine room, such as, for example, under testing conditions, or under emergency conditions where, for example, the bridge controller may have been blown away by enemy fire or under conditions of electrical failure of the synchros or electrical power supply, the manual control of the pitch of the propeller blades may be effected by operation of the control lever 156 in the engine room upon adjustment first of the transfer control lever 14 in a counterclockwise direction, so as to connect elements 53 and 54 of the coupling 50 and cause the switch 40 to electrically open the connecting circuit between the synchros 28 and 44.

Any order of change of pitch of the blades of the propeller 2 may be set by the engine room control lever 156 which through gears 158 and 160, flexible shaft 162, gears 164, shaft 55, coupling 50, gearing 60 and 61 and differential gearing 62 rotates the motion storage device 64 in the same manner as previously described, where the gears 60 and 61 were rotated by synchro 44. The servo valve 68 controlled by the motion storage device 64 and the servo piston 78 operates as previously described. It should be noted, however, that while the bridge control indicator pointer 139 will in normal operation still indicate the actual propeller pitch (as does the engine room indicator pointer 153) the position of the bridge control synchro 28 will have no significance because of the action of switch 40 in opening the connection between the transmitter synchro 28 and the receiver synchro 44. However, should the transfer control lever 14 be once again returned to the bridge control position disengaging the coupling 50 and closing switch 40, the receiver synchro 44, which was heretofore manually adjusted by the engine room control lever 156 through shafts 55 and 56, will, upon the closing of switch 40, adjust the gearing 60, 61 and 62 and motion storage device 64 so as to bring the pitch of the propeller 2 to that selected by the position of the bridge control lever 36.

As can now be readily seen from the foregoing explanation and reference to the schematic drawing of Figure 2, the control system provides for remote propeller pitch control from either of two stations, the bridge or the engine room of the vessel. While control is not effected simultaneously from both stations, indication of the actual pitch of the propeller 2 is provided at both stations irrespective of which station is the control station at the time.

The aforedescribed features of the propeller pitch control system are further described and claimed in a copending application Serial No. 273,395, filed February 26, 1952, by Charles Russell, and assigned to Bendix Aviation Corporation, the assignee of the present application.

The present application is directed to the subject matter of invention of the novel motion storage device 64 shown in Figures 3, 4 and 5 and to the modified form of the invention as shown in the novel motion storage device illustrated at Figures 6 and 7, as hereinafter described.

*Motion storage device of Figures 3, 4 and 5*

The motion storage device 64 is an arrangement of a boss or gear 165 having a single notch or tooth 166 and mating pinion arm 167. There is further provided a piloting cam 169 and pin 170 attached to the gear 165 and arm 167, respectively. As can be readily seen in Figure 4, the single tooth gear 165 is a part of a wheel 172. This wheel 172 has the single tooth gear or central boss 165 and a wide flanged portion or internal ring 174 to which is secured by a bolt 176 the piloting cam 169.

The arm 167 is pivotally mounted on roller bearings 178 and there is formed in one end of the arm 167 a tooth 180. There is mounted on the arm 167, near the tooth 180, the pin 170 and at the opposite end of the arm 167 there is provided a bracket 182 to which is connected the push rod 66 for actuating the servo valve 68.

As shown in Figure 3, the wheel 172 is affixed to and rotated by the spider shaft 112, so that the arm 167 moves a small angular amount only regardless of the rotation of the wheel 172. The wheel 172 can effect movement of the arm 167 only while the tooth 180 and the notch or tooth cut out 166 in the boss are engaged. Figure 5 shows the limit of angular motion of the arm 167 as the wheel 172 has turned to disengage the single tooth 180 from the notch 166. The wheel 172 may now rotate approximately 360° before it is stopped without imparting any further movement to the arm 167.

However, as the wheel 172 is rotated back by the spider shaft 112 through action of the follow-up rack 84, the cam 169 acts against the pin 170 on the arm 167 so as to pilot the tooth element 180 into the cut-out or notch 166 and cause the arm 167 to return the servo valve 68 to a neutral position.

It will be seen then that the motion storage device 64 in effect provides a maximum opening of the servo valve 68 with a few degrees of rotation of the control synchro 44 in response to adjustment of the signal transmitting synchro 28 positioned by the control lever 36 and permits the control synchro 44 to be further rotated without changing the valve position upon additional movement being imparted to lever 36 and the transmitting synchro 28. Further, because of the non-engagement of the tooth elements 166 and 180 in the latter adjusted position, as shown for example in Figure 5, continued rotation of the wheel 172 in the same direction or in a clockwise direction, as viewed in Figure 5, imparts no further movement to the servo valve 68 and such motion is in effect stored up by the continued clockwise rotation of the wheel 172 until the engagement of cam 169 with pin 170 at the extreme limit of clockwise movement of the wheel 172. Such motion stored in the device of Figure 5 is not lost, since upon movement of the servo motor 78 in response to the initial adjustment of the servo valve 68, the servo motor 78 operates through the rod 80, arm 82, rack 84, pinion gear 86, to rotate gears 90—92, hollow shaft 96, and gear 100 of the differential gear 62 which, because gear 114, 61 and 60 are held by the torque exerted by the synchro 44 causes spider 110 and shaft 112 to move wheel 172 in a counter-clockwise follow-up direction to ultimately reset the tooth 180 in notch 166 upon the stored motion aforenoted being expended. Thus the concept of stored energy is evident in that the follow-up motion of the rack 84 moves only the wheel 172, until the cam 169 engages the pin 170 on the arm 167 to re-engage the tooth 180 in notch 166 and return the arm 167 to the neutral position.

*Motion storage device of Figures 6, 7, 8 and 9*

Another form of motion storage device which may be used in the propeller pitch control system of Figure 2 is shown in Figures 6, 7, 8 and 9. The latter motion storage device includes four gears 200, 202, 204 and 206 and two index plates 208 and 210 so arranged as to impart a motion to a lever 212 or other actuating member in a manner that will, regardless of the number of revolutions of the prime mover, within the designed operating range of the gears 200, 202, 204 and 206, always remain synchronous with the starting point of the motion.

Referring to the drawing of Figures 6 and 7, the gears 200 and 202 are secured to the shaft 112 and may be fastened together by a pin 214 so as to be driven together by the shaft 112 of the control system of Figure 2. The gear 202 has a greater number of teeth than the gear 200, for example, twenty-seven and twenty-six teeth, respectively.

The gear 200 is meshed with the gear 204 of the same dimensions and teeth (twenty-seven) as the gear 202, while the gear 202 is meshed with the gear 206 of the same dimensions and teeth (twenty-six) as the gear 200. The gears 204 and 206 are freely rotatable on a stub shaft 216.

Affixed to the gear 204 by a pin 218 is the index plate 208 and affixed to the gear 206 by a pin 220 is an index plate 210. The index plate 208, shown in Figure 9, has a tooth space 222 cut in the periphery thereof, while the index place 210, shown in Figure 8 has a tooth space 224 cut in its periphery. The tooth spaces 222 and 224, as hereinafter explained, serve as indexing points.

The index plates 208 and 210 are so arranged that when all four gears 200, 202, 204 and 206 are meshed as heretofore indicated, the indexing tooth spaces 222 and 224 coincide at a given neutral point as shown in Figure 6. The lever 212 pivotally mounted on a stub shaft 226 has provided a bracket 228 at one end to which the actuating rod 66 for servo valve 68 of the control system of Figure 2 may be attached, while at the opposite end of the lever 212, there is formed a single tooth 231 meshing in a neutral position in the tooth spaces 222 and 224 of the indexing plates 208 and 210, as shown in Figures 6 and 7. Movement of the gearing 204 and 206 from the neutral position causes the tooth spaces 222 and 224 of the index plates 208 and 210 to move out of coinciding relation causing adjustment of the lever 212 to one side or the other of the neutral position depending upon the direction of rotation of the shaft 112 causing the tooth 231 to ride along the periphery of the index plates 208 and 210 to effect a corresponding adjustment of the servo valve 68.

It will be seen then that the device of Figures 6 and 7, like the device of Figure 4, in effect provides a maximum opening of the servo valve 68 with a few degrees of rotation of the gearing 204 and 206 by the control synchro 44 in response to adjustment of the transmitting synchro 28 positioned by the control lever 36 and permits the control synchro 44 to be further rotated without changing the valve position upon additional movement being imparted to the lever 36 and transmitting synchro 28.

However, while the motion storage device of Figures 3, 4 and 5 is limited to approximately 360 degrees of rotation of the wheel 172, the number of revolutions of the gearing 200 and 202 by the prime mover that can be stored in the device of Figures 6 and 7 is limited only by the gear ratio between gearing 200, 202, 204 and 206. The subject device in which gears 200 and 206 have twenty-six teeth and the gears 202 and 204 have twenty-seven teeth cooperating therewith has a capacity for storing thirteen revolutions of the gearing 200 and 202 in either direction from the center of neutral point shown in Figure 6, while the device of Figures 3, 4 and 5 has the capacity for storing only a single rotation of the wheel 172. A centering device or spring 233 fixed at one end 235 in the stub shaft 226 bears at the opposite end on pin 239 or pin 241 projecting from the arm 212 serves to bias the arm back to the neutral position and to maintain the single tooth 231 in contacting relation with the periphery of the indexing plates 208 and 210.

Although several embodiments of the invention have been illustrated and described, various changes in the form and relative arrangements of the parts may be made to suit requirements.

What is claimed is:

1. For use in a system for controlling pitch of a propeller of a type including motor means for varying the pitch of said propeller, control means for said motor means, a power transmission, pilot operable means for driving said power transmission in one sense, and follow-up means operable by said motor means for driving said power transmission in an opposite sense, the combination comprising a pivotally mounted control arm for operating the motor control means between a neutral position and two extreme positions at opposite sides of the neutral position, a plurality of circular members, each of said members having a peripheral edge with a notch therein, means driven by said power transmission for rotating said members at different rates, said control arm having a tooth at one end thereof, pin means projecting from said control arm, actuating means affecting said pin means so as to bias the control arm in a direction to cause the tooth at one end of the control arm to enter the notches of said members when said notches are all aligned with said tooth simultaneously to effect pivotal adjustment of the control arm and thereby adjustment of the motor control means to the neutral position, and the peripheral edge of at least one of said members actuating the tooth end of the pivotal control arm out of said notches so as to bear upon the peripheral edges of the members upon the rotation of said members at different rates so as to cause said control arm to be directly actuated by said one circular member to one of said extreme positions upon operation of the power transmission in the one sense by the pilot operable means and by said actuating means to the neutral position upon operation of the power transmission in the opposite sense by said motor means.

2. A motion storage device comprising a first shaft rotatable in opposite directions from a predetermined neutral position, a second shaft, a single control arm pivotally mounted on said second shaft and movable between a neutral position and two extreme positions at opposite sides of the neutral position, a rotatable member including a circular boss having a notch in the periphery thereof and an annular flange surrounding said boss and formed integral therewith, means drivingly connecting said first shaft to said member, said control arm having a tooth at one end thereof, a pin projecting from said control arm adjacent the tooth end thereof, said flange having an internal cam surface bearing upon said pin and so arranged as to bias the control arm in a direction to cause the tooth at the one end of the control arm to enter said notch when the notch is aligned with said tooth to effect pivotal adjustment of the control arm to its neutral position upon the first shaft being adjusted to its predetermined neutral position, and the same control arm being so arranged as to be directly actuated by said circular boss to one of said extreme positions upon rotation of said first shaft in one direction from the neutral position and to the other extreme position upon rotation of the first shaft in the opposite direction from the neutral position.

3. A motion storage device comprising a first shaft rotatable in opposite directions from a predetermined neutral position, a second shaft, a single control arm pivotally mounted on said second shaft and movable between a neutral position and two extreme positions at opposite sides of the neutral position, a circular member having a notch in the periphery thereof, means drivingly connecting said first shaft to said member, said control arm having a tooth at one end thereof, pin means projecting from said control arm, an internal ring affixed to said circular member and including a cam portion acting directly upon said pin means so as to bias the control arm in a direction to cause the tooth at the one end of the control arm to enter said notch when said notch is aligned with said tooth to effect pivotal adjustment of the control arm to its neutral position upon the first shaft being adjusted to its predetermined neutral position, and the same control arm being so arranged as to be directly actuated by said circular member to one of said extreme positions upon rotation of said first shaft in one direction from the neutral position and to the other extreme position upon rotation of the first shaft in the opposite direction from the neutral position.

4. A motion storage device comprising a first shaft rotatable in opposite directions from a predetermined neutral position, a second shaft, a single control arm pivotally mounted on said second shaft and movable between a neutral position and two extreme positions at opposite sides of the neutral position, a circular member having a notch in the periphery thereof, means drivingly connecting said first shaft to said member, said control arm having a single tooth at one end thereof, pin means projecting laterally from said control arm, a spring member affixed at one end to said second shaft and having the opposite end thereof acting directly upon said laterally projecting pin means so as to bias the control arm in a direction to cause the single tooth at the one end of the control arm to enter said notch when said notch is aligned with said tooth to effect pivotal adjustment of the control arm to its neutral position upon the first shaft being adjusted to its predetermined neutral position, and the single tooth of said control arm being so arranged as to be directly actuated by said circular member so as to position said control arm to one of said extreme positions upon rotation of said first shaft in one direction from the neutral position and to the other extreme position upon rotation of the first shaft in the opposite direction from the neutral position.

5. A motion storage device comprising a first shaft rotable in opposite directions from a predetermined neutral position, a second shaft, a single control arm pivotally mounted on said second shaft and movable between a neutral position and two extreme positions at opposite sides of the neutral position, a circular member having a notch in the periphery thereof, means drivingly connecting said first shaft to said member, said control arm having a single tooth at one end thereof, pin means projecting laterally from said control arm, actuating means acting directly upon said laterally projecting pin means so as to bias the control arm in a direction to cause the single tooth at the one end of the control arm to enter said notch when said notch is aligned with said tooth to effect pivotal adjustment of the control arm to its neutral position upon the first shaft being adjusted to its predetermined neutral position, and the single tooth of said control arm being so arranged as to be directly actuated by said circular member so as to position said control arm to one of said extreme positions upon rotation of said first shaft in one direction from the neutral position and to the other extreme position upon rotation of the first shaft in the opposite direction from the neutral position.

6. A motion storage device comprising a first shaft rotatable in opposite directions from a predetermined neutral position, a second shaft, a control arm pivotally mounted on said second shaft and movable between a neutral position and two extreme positions at opposite sides of the neutral position, a first gear and a second gear rigidly attached to said first shaft, a third shaft, a third gear and a fourth gear freely rotatable on said third shaft and meshing with said first and second gears respectively, two circular plates, one of said plates affixed to said third gear and the other of said plates affixed to the fourth gear, the ratio of said first and third gears and said second and fourth gears being such that the plates are rotated at different rates in response to rotation of said first shaft from said predetermined neutral position, each of said plates being provided at its periphery with a notch, said control arm having a tooth at one end thereof, a resilient member affixed at one end to said second shaft and extending substantially along a common line intersecting the axes of the arm, shafts and gears, means projecting from said arm and engageable by the other end of said resilient member so that said resilient member tends to maintain the arm substantially on said common line and biases the arm so as to cause the tooth at the one end thereof to enter said notches when both of said notches are aligned with said tooth simultaneously so as to effect pivotal adjustment of the control arm to the neutral position upon the first shaft being adjusted to said predetermined neutral position, and said control arm being adjustably positioned by at least one of said plates to one of said extreme positions upon rotation of said first shaft in one direction from the neutral position and to the other extreme position upon rotation of the first shaft in the opposite direction from the neutral position.

7. A motion storage device comprising a rotatable shaft, a plurality of indexing plates, each of said plates having a peripheral edge with a notch therein, means for rotating said plates at different rates in response to rotation of said shaft, a pivotal control arm having a tooth at one end thereof for entering said notches when said notches are all aligned with said tooth simultaneously, means for biasing the tooth end of said arm into contacting relation with the peripheral edges of the plates, and the peripheral edge of at least one of said plates actuating the tooth end of the pivotal control arm out of said notches so as to bear upon the peripheral edges of the plates upon the rotation of said plates at different rates.

8. A motion storage device comprising a rotatable shaft, a plurality of indexing plates, means for rotating the plates at different angular velocities in response to rotation of the shaft, each of said indexing plates having a peripheral edge and a notch therein, a control arm, means pivotally mounting said control arm in contacting relation with said indexing plates, said control arm having a tooth at one end thereof to be received in the notches of said plates when said indexing plates are adjusted to a predetermined neutral position at which said notches are aligned with said tooth, said control arm being adjustably positioned on said pivotal mounting means to one side of the neutral position and out of said notches by the peripheral edge of at least one of said plates upon the rotation of the indexing plates at different angular velocities, and spring means maintaining the tooth end of said arm in contacting relation with the peripheral edges of the indexing plates when said plates are rotated at different angular velocities so as to position said notches out of alignment with said tooth.

References Cited in the file of this patent

UNITED STATES PATENTS

| 1,998,189 | Erling | Apr. 16, 1935 |
| 2,403,935 | Link | July 16, 1946 |
| 2,423,191 | Kopp | July 1, 1947 |
| 2,505,206 | Richardson et al. | Apr. 25, 1950 |

FOREIGN PATENTS

| 453,892 | Germany | June 6, 1926 |
| 865,554 | France | Mar. 3, 1941 |